(12) United States Patent
Fukushima et al.

(10) Patent No.: US 7,159,929 B2
(45) Date of Patent: Jan. 9, 2007

(54) VEHICLE SLIDE-DOOR SUPPORTING STRUCTURE

(75) Inventors: Yoshio Fukushima, Fuchu-cho (JP); Motoki Yoshida, Fuchu-cho (JP); Takashi Niseki, Fuchu-cho (JP); Noriaki Fujie, Fuchu-cho (JP); Seiji Ikejiri, Fuchu-cho (JP); Kouji Tabata, Fuchu-cho (JP); Noboru Yoshii, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 64 days.

(21) Appl. No.: 10/930,906

(22) Filed: Sep. 1, 2004

(65) Prior Publication Data

US 2005/0044795 A1     Mar. 3, 2005

(30) Foreign Application Priority Data

| Sep. 3, 2003 | (JP) | ............................. 2003-311382 |
| Sep. 3, 2003 | (JP) | ............................. 2003-311383 |
| Sep. 3, 2003 | (JP) | ............................. 2003-311384 |
| Sep. 3, 2003 | (JP) | ............................. 2003-311385 |

(51) Int. Cl.
    *B60J 5/06*     (2006.01)

(52) U.S. Cl. .................................................... 296/155

(58) Field of Classification Search ............... 296/155, 296/146.1, 147; 49/501, 324
See application file for complete search history.

(56) References Cited

U.S. PATENT DOCUMENTS

| 4,887,390 A | 12/1989 | Boyko et al. |
| 4,991,905 A * | 2/1991 | Watanabe et al. ............ 296/155 |
| 5,322,339 A * | 6/1994 | Dubernard ................... 296/155 |
| 5,876,087 A * | 3/1999 | Kleefeldt et al. ............ 296/155 |
| 6,390,536 B1 * | 5/2002 | Tsubokura et al. .......... 296/155 |
| 6,776,450 B1 * | 8/2004 | Okubo et al. ............. 296/146.9 |
| 6,971,706 B1 * | 12/2005 | Yoshida et al. .............. 296/155 |
| 2001/0006298 A1 * | 7/2001 | Tsubokura et al. .......... 296/155 |
| 2003/0071484 A1 | 4/2003 | Okubo et al. |
| 2005/0253421 A1 * | 11/2005 | Kusumoto ............. 296/203.03 |
| 2006/0043766 A1 * | 3/2006 | Tanigawa ................... 296/155 |

FOREIGN PATENT DOCUMENTS

| JP | 60-092925 | 5/1985 |
| JP | 2003-082927 | 3/2003 |

OTHER PUBLICATIONS

European Search Report dated Nov. 16, 2004 for Application No. EP-04-02-0773.

* cited by examiner

*Primary Examiner*—H Gutman
(74) *Attorney, Agent, or Firm*—Nixon Peabody LLP; Donald R. Studebaker

(57) ABSTRACT

A vehicle slide-door supporting structure is provided which includes: a slide door which is a side door that opens and closes an opening through which a person gets into and out of a vehicle, the opening being formed in a side part of a vehicle body, the side door being slid in the front and rear directions so that the opening is opened and closed, and the opening being opened when the side door is slid rearward; and a driving mechanism which is connected to the slide door and drives the slide door, in which one part of the driving mechanism is attached to a tail lamp which is disposed at the rear part of the vehicle body.

32 Claims, 10 Drawing Sheets

VEHICLE SLIDE-DOOR SUPPORTING STRUCTURE

BACKGROUND OF THE INVENTION

1. Field of the Invention

This invention relates to a vehicle slide-door supporting structure.

2. Description of the Related Art

Some vehicles have a slide door which is slid in their front and rear directions, as a side door that opens and closes an opening through which passengers get into and out of a vehicle. Herein, the opening is formed in the side part of a vehicle body. Such a slide door is used, especially for the rearmost side door in the vehicle. The slide door has generally been used for a so-called one-box car or one-and-half box car, and the like. A slide door like this needs to be smoothly slid along a predetermined track. To do that, a guide rail is provided which extends in the front and rear directions in the side part of the vehicle body. Into the guide rail, a door support member provided in the slide door is fitted so that it can be slid. In this case, the opening through which passengers get into and out of the vehicle is usually opened by sliding rearward the slide door which keeps the opening closed.

Japanese Patent Laid-Open No. 2003-82927 specification discloses a slide door which is provided as an additional component with a driving mechanism. This helps drive the slide door easily, in other words, open and close it without difficulty. Such a driving mechanism usually drives the above described door support member, or a wire connected to the slide door, in the front and rear directions by means of a motor. The wire is guided midway by a guide pulley or the like. In many cases, the guide pulley is provided, for example, in at least two front and rear positions, such as at or near the front-end part and the rear-end part of the guide rail.

In recent years, demand has risen for making larger in the front and rear directions the area of an opening through which passengers get into and out of a vehicle when a slide door is opened. Aiming at meeting the demand, the idea has been presented of sliding the slide door rearward farther than any conventional one. However, if the slide door is slid rearward largely, only a small space remains in the rear part of the vehicle body. This makes it difficult to dispose the one part of the driving mechanism in the slide door, such as the guide pulley, in the space. In other words, the driving mechanism which drives the slide door becomes hard to dispose rearward sufficiently. As a result, if the driving mechanism is installed, that blocks an adequate rearward slide of the slide door. Herein, if the slide door is manually opened and closed, there is no need for any driving mechanism. In that case, the slide door can be slid rearward as far as required.

In addition, if the guide rail is simply extended rearward, there is a disadvantage in that the rear-end part of the guide rail may greatly affect the design of the side part of the vehicle body, thus spoiling its external appearance. In other words, the guide rail is provided, and in addition, the door support member connected on the side of the vehicle body is fitted into the guide rail from the outside of the vehicle body. This needs an arrow opening portion which extends in the front and rear directions along the guide rail in the side part of the vehicle body. This opening portion which extends in the front and rear directions may enormously affect the design of the side part of the vehicle body.

In the rear part of the vehicle body, a tail lamp is disposed at each end part thereof in the vehicle-width directions (i.e., in the right-and-left directions). If the rear-end part of the guide rail is located far apart from the tail lamp in the up-and-down directions, or in another such case, they cannot be well arranged from the viewpoint of design. Hence, the side part of the vehicle body, as a whole, may become uneven in respect of design. This disadvantage could not be bypassed in the case of a private car, especially, a luxury private car, even apart from an automobile for business use whose design is not necessarily important.

SUMMARY OF INVENTION

In view of the above described disadvantages, it is an object of the present invention to provide a vehicle slide-door supporting structure which is capable of sliding a slide door rearward over a longer distance, and installing a driving mechanism of the slide door.

In addition, it is another object of the present invention to provide a vehicle slide-door supporting structure which is capable of sliding the slide door rearward over a longer distance, and in respect of design, giving a good external appearance to the rear-end part of the vehicle-body side part.

In order to attain the above described objects, the following resolution art is adopted. The vehicle slide-door supporting structure according to an aspect of the present invention, comprising: a slide door which is a side door that opens and closes an opening through which a person gets into and out of a vehicle, the opening being formed in a side part of a vehicle body, the side door being slid in the front and rear directions so that the opening is opened and closed, and the opening being opened when the side door is slid rearward; and a driving mechanism which is connected to the slide door and drives the slide door, wherein one part of the driving mechanism is attached to a tail lamp which is disposed at the rear part of the vehicle body. According to this resolution art, the one part of the driving mechanism is attached to the tail lamp and thus is located rearward sufficiently. This allows the slide door to slide rearward sufficiently, in other words, widens, in the front and rear directions, the opening which is opened and closed by the slide door. Thereby, a person easily gets into and out of the vehicle.

Preferred aspects based on the above described resolution art are described below. A concave portion which is opened frontward is formed in the front part of the tail lamp; and the one part of the driving mechanism is located inside of the concave portion. In this case, the one part of the driving mechanism is located rearward sufficiently by using the concave portion formed in the front part of the tail lamp. This allows the slide door to slide rearward farther.

Furthermore, the one part of the driving mechanism is attached to an attachment portion of the tail lamp to the vehicle body. In this case, the attachment portion to the vehicle body is one of the strong parts in the tail lamp, and it is effectively used. This makes it possible to attach the one part of the driving mechanism tightly to the tail lamp.

Moreover, the one part of the driving mechanism and the tail lamp are assembled beforehand into a unit body, and the unit body is attached to the vehicle body so that the part of the driving mechanism and the tail lamp are attached to the vehicle body. In this case, the tail lamp and the one part of the driving mechanism can be united in advance, i.e., as a module.

In addition, an attachment portion of the tail lamp to the vehicle body, together with the one part of the driving mechanism, is fixed on the vehicle body, by means of a fixing part. In this case, the attachment of the tail lamp to the vehicle body and the attachment of the one part of the driving mechanism to the vehicle body can be conducted using common fixing parts.

Furthermore, the driving mechanism includes a wire which is connected to the slide door, a drive portion which drives the slide door via the wire, and a guide portion which guides the wire; and the one part of the driving mechanism which is attached to the tail lamp is the guide portion. In this case, the driving mechanism can be made general.

Moreover, the guide portion is a guide pulley around which the wire is placed. In this case, the guide portion becomes more distinct.

In addition, in the rear part of the vehicle body, a boundary position between the vehicle-body rear plane and the vehicle-body side plane is covered with the tail lamp, from the outside of the vehicle body; and the one part of the driving mechanism is disposed to protrude at the boundary position between the vehicle-body rear plane and the vehicle-body side plane and toward the outside of the vehicle body. In this case, different from the case where the guide portion is located only at the vehicle-body side plane or only at the vehicle-body rear plane, there is no need to bend the wire by force near the guide portion. This allows the slide door to be driven more smoothly.

Furthermore, in the side part of the vehicle body, a guide rail is disposed which extends in the front and rear directions and guides the slide door in the front and rear directions; and the rear end of the guide rail extends rearward long up to a position adjacent to the tail lamp. In this case, by means of the guide rail, the slide door can be guided rearward sufficiently.

Moreover, at least the rear end of the guide rail is positioned substantially at the same height as the horizontally-seen line of the tail lamp. In this case, if seen from the side of the vehicle body, the guide rail appears on the outside of the vehicle body and forms a kind of parting line. That guide rail is positioned substantially at the same height as the horizontally-seen line of the tail lamp. Therefore, the part from the guide rail over to the tail lamp becomes continuous in respect of design, thus giving a better external appearance.

In addition, a cover member is disposed which forms an exterior surface of the vehicle body and covers the guide rail from the outside of the vehicle body; the lower edge of the cover member extends in the front and rear directions along the guide rail and is substantially at the same height as the horizontally-seen line of the tail lamp; and the exterior surface of the cover member continues to the exterior surface of the tail lamp with little space and substantially on the same surface. In this case, the cover member which covers the guide rail helps improve the external appearance over the long range in the front and rear directions from behind the slide door which is kept closed over to the tail lamp.

Furthermore, the following resolution art is adopted. The vehicle slide-door supporting structure according to another aspect of the present invention, comprising: a slide door which is a side door that opens and closes an opening through which a person gets into and out of a vehicle, the opening being formed in a side part of a vehicle body, the side door being slid in the front and rear directions so that the opening is opened and closed, and the opening being opened when the side door is slid rearward; and a driving mechanism which is connected to the slide door and drives the slide door, wherein one part of the driving mechanism is wrapped from frontward in a tail lamp which is disposed at the rear part of the vehicle body. According to this resolution art, the one part of the driving mechanism is located rearward sufficiently so that it can be wrapped from frontward in the tail lamp. This allows the slide door to slide rearward sufficiently, in other words, widens, in the front and rear directions, the opening which is opened and closed by the slide door. Thereby, a person easily gets into and out of the vehicle.

Preferred aspects based on the above described resolution art are described below. In the one part of the driving mechanism, at least a rear-end part thereof overlaps with the tail lamp in the vehicle-width directions, if seen from the side of the vehicle body. Besides, the whole one part of the driving mechanism is located behind the front end of the tail lamp. In both cases, the positional relation between the one part of the driving mechanism and the tail lamp becomes more definite in the front and rear directions.

Moreover, the driving mechanism includes a wire which is connected to the slide door, a drive portion which drives the slide door via the wire, and a guide portion which guides the wire; and the one part of the driving mechanism is the guide portion. In this case, the driving mechanism can be made general. Besides, the member which is wrapped from frontward in the tail lamp becomes distinct.

Moreover, the guide portion is a guide pulley around which the wire is placed. In this case, the guide portion becomes more distinct.

Furthermore, in the side part of the vehicle body, a guide rail is disposed which extends in the front and rear directions and guides the slide door in the front and rear directions; and the rear end of the guide rail extends rearward long up to a position adjacent to the tail lamp. In this case, by means of the guide rail, the slide door can be guided rearward sufficiently.

Moreover, at least the rear end of the guide rail is positioned substantially at the same height as the horizontally-seen line of the tail lamp. In this case, if seen from the side of the vehicle body, the guide rail appears on the outside of the vehicle body and forms a kind of parting line. That guide rail is positioned substantially at the same height as the horizontally-seen line of the tail lamp. Therefore, the part from the guide rail over to the tail lamp becomes continuous in respect of design, thus giving a better external appearance.

In addition, a cover member is disposed which forms an exterior surface of the vehicle body and covers the guide rail from the outside of the vehicle body; the lower edge of the cover member extends in the front and rear directions along the guide rail and is substantially at the same height as the horizontally-seen line of the tail lamp; and the exterior surface of the cover member continues to the exterior surface of the tail lamp with little space and substantially on the same surface. In this case, the cover member which covers the guide rail helps improve the external appearance over the long range in the front and rear directions from behind the slide door which is kept closed over to the tail lamp.

Furthermore, the guide pulley is disposed to protrude toward the outside of the vehicle body from a vehicle-body panel member to which the guide rail is attached. In this case, there is no need to bend the wire by force at the part of the guide pulley. This allows the slide door to be driven more smoothly. Besides, the guide pulley is located rearward sufficiently so that it can be wrapped from frontward in the tail lamp.

Moreover, the guide pulley is disposed in a boundary position between the vehicle-body rear plane and the vehicle-body side plane in the rear part of the vehicle body. In this case, different from the case where the guide pulley is located only at the vehicle-body side plane or only at the vehicle-body rear plane, there is no need to bend the wire by force near the guide pulley. This allows the slide door to be driven more smoothly.

In addition, a concave portion which is opened frontward is formed in the front part of the tail lamp; and the guide pulley is located inside of the concave portion. In this case, the guide pulley is located rearward further sufficiently, so that the slide door can be slid rearward further.

Furthermore, in the side part of the vehicle body, a guide rail is disposed which extends in the front and rear directions and guides the slide door; in the slide door, a door support member is disposed which fits into the guide rail so that it is slid; the guide rail extends rearward long so that the rear end thereof comes close to the tail lamp which is disposed at the rear part of the vehicle body; and a cover member is disposed which forms an exterior surface of the vehicle body, covers at least the rear-end part of the guide rail from the outside of the vehicle body and continues to the front edge of the tail lamp. In this case, the guide rail extends rearward long up to the vicinity of the tail lamp, so that the slide door can be moved rearward longer. This widens, in the front and rear directions, the opening which is opened and closed by the slide door. Thereby, a person easily gets into and out of the vehicle. Besides, at least the rear-end part of the guide rail which continues to the tail lamp is covered with the cover member which forms an exterior surface of the vehicle body. This improves, to a sufficient level, the external appearance of the vehicle-body side part from the guide rail over to the tail lamp.

In addition, the lower edge of the cover member extends straight in the front and rear directions along the guide rail; the lower edge of the cover member continues to a panel member with a little space in the up-and-down directions and substantially on the same surface, the panel member being located below the cover member and forming an exterior surface of the vehicle body; the door support member is disposed to pass through the space and slide along the lower edge of the cover member; and the front edge of the cover member continues adjacently and smoothly to the rear edge of the slide door which is kept closed. In this case, the cover member which covers the guide rail can form an exterior surface of the vehicle body, over a long distance in the front and rear directions from behind the slide door which is kept closed over to the tail lamp.

Moreover, the panel member has a level difference which dents toward the inside of the vehicle body and extends in the front and rear directions, and above the level difference, the guide rail and the cover member are disposed; in the panel member, rear quarter-window glass is attached to an upper panel portion which is located upward from the level difference; and the cover member connects smoothly the upper edge of a lower panel portion which is located downward from the level difference in the panel member and the lower edge of the rear quarter-window glass. In this case, the guide rail and the cover member can be disposed, using the level difference formed in the panel member which forms an exterior surface of the vehicle body. Besides, the panel member is not divided and continues in the up-and-down directions in the position of the guide rail. This strengthens the vehicle body, or makes its production easier.

Furthermore, the following resolution art is adopted. The vehicle slide-door supporting structure according to still another aspect of the present invention, comprising: a slide door which is a side door that opens and closes an opening through which a person gets into and out of a vehicle, the opening being formed in a side part of a vehicle body, the side door being slid in the front and rear directions so that the opening is opened and closed, and the opening being opened when the side door is slid rearward; in the side part of the vehicle body, a guide rail is disposed which extends in the front and rear directions and guides the slide door; in the slide door, a door support member is disposed which fits into the guide rail so that it is slid; the guide rail extends rearward long so that the rear end thereof comes close to the tail lamp which is disposed at the rear part of the vehicle body; and the horizontally-seen line of the tail lamp is set to be substantially at the same height as the guide rail. According to this resolution art, the guide rail extends rearward long up to the vicinity of the tail lamp, so that the slide door can be moved rearward longer. This widens, in the front and rear directions, the opening which is opened and closed by the slide door. Thereby, a person easily gets into and out of the vehicle. Besides, if the vehicle body is seen from its side, the guide rail appears on the outside of the vehicle body and forms a kind of parting line. That guide rail is positioned substantially at the same height as the horizontally-seen line of the tail lamp. Therefore, the part from the guide rail over to the tail lamp becomes continuous in respect of design, thus giving a better external appearance.

Preferred aspects based on the above described resolution art are described below. The door support member is slid up to the vicinity of the tail lamp as the slide door moves rearward. In this case, the door support member can be moved rearward sufficiently, thereby widening, in the front and rear directions, the opening through which a person gets into and out of the vehicle.

Moreover, the rear-end part of the guide rail extends rearward from the front end of the tail lamp, if seen from the side of the vehicle body. In this case, the slide door itself can be moved rearward further sufficiently.

In addition, the door support member is slid rearward so that the rear-end part thereof is positioned behind the front end of the tail lamp. In this case, the door support member, or the slide door can be moved rearward further.

Furthermore, a cover member is disposed which covers the guide rail from the outside of the vehicle body and whose lower edge extends in the front and rear directions; the cover member forms an exterior surface of the vehicle body and continues to a panel member with a little space in the up-and-down directions and substantially on the same surface, the panel member being located below the cover member and forming an exterior surface of the vehicle body; and the door support member is disposed to pass through the space and slide along the lower edge of the cover member. In this case, the guide rail is covered with the cover member, thus improving its external appearance. Besides, the cover member continues to the panel member which is located below it, substantially on the same surface. This improves the external appearance of the part from the panel member over to the cover member.

Moreover, the lower edge of the cover member extends straight in the front and rear directions substantially at the same height as the lower horizontally-seen line of the tail lamp; and the exterior surface of the cover member continues to the exterior surface of the tail lamp with little space and substantially on the same surface. In this case, the part from the cover member over to the tail lamp is also a continuous surface, thereby improving its external appearance further.

These and other objects, features and advantages of the present invention will become more apparent upon reading of the following detailed description along with the accompanied drawings.

DETAILED DESCRIPTION OF INVENTION

Figure 1:
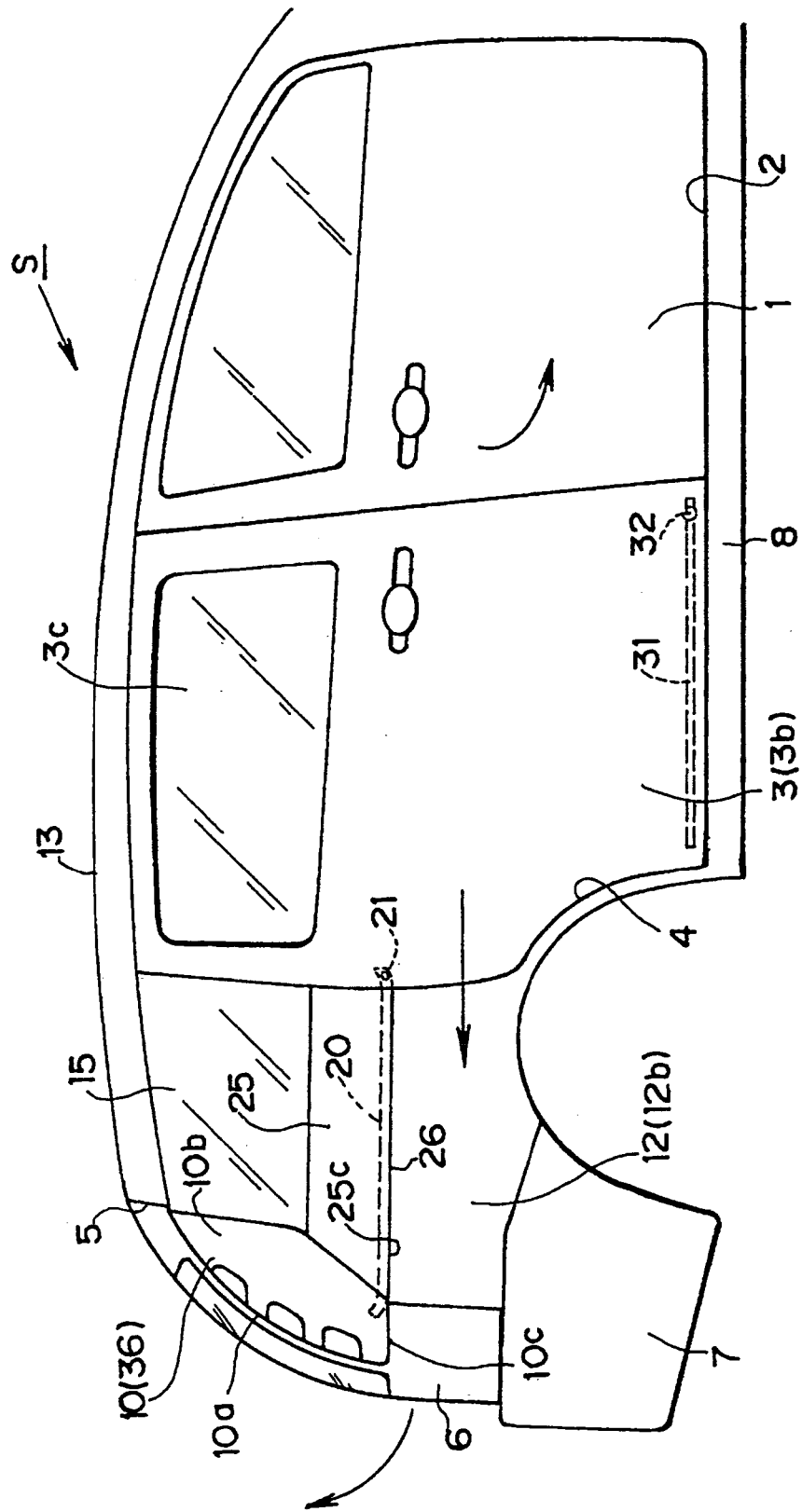
FIG. 1 is a side view of a vehicle body according to an embodiment of the present invention.

In FIG. 1, a front side door 1 which is used for a driver's seat or an assistant seat in a vehicle S swings on its front-end part so that it can be opened and closed. It opens and closes a front opening 2 through which a person gets into and out of the vehicle S. Herein, the front opening 2 leads from a vehicle cabin to the outside of the vehicle S. In the side part of a vehicle body, a slide door 3 is provided as a rear side door which is located behind the front side door 1. This slide door 3 is used to open and close a rear opening 4 for a backseat (also see FIG. 4) through which a person gets into and out of the vehicle S. It slides in the front and rear directions. When located at the front slide end, it covers the rear opening 4 which leads from the vehicle cabin to the outside of the vehicle S. That is called a closed position. When moved rearward, it comes to an opened position where it opens the rear opening 4. As shown in FIG. 5, such a slide door 3 has a section which is closed with an inner panel 3a and an outer panel 3b. In its upper part, a pane of window glass 3c is fitted (see FIG. 1 to FIG. 4).

Figure 4:
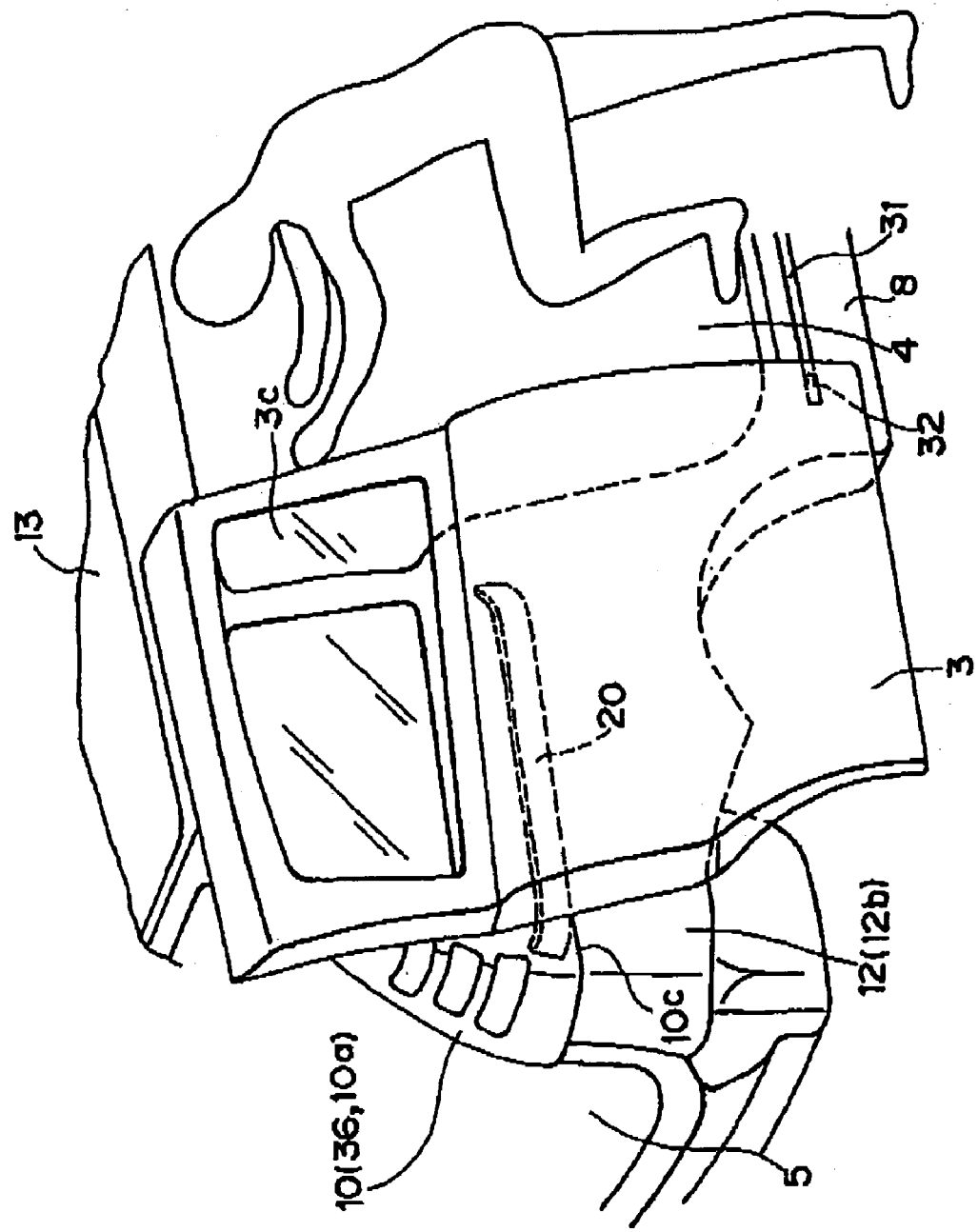
FIG. 4 is a perspective view of the vehicle-body rear part in FIG. 2, showing a state where a slide door is slid rearward.
Figure 5:
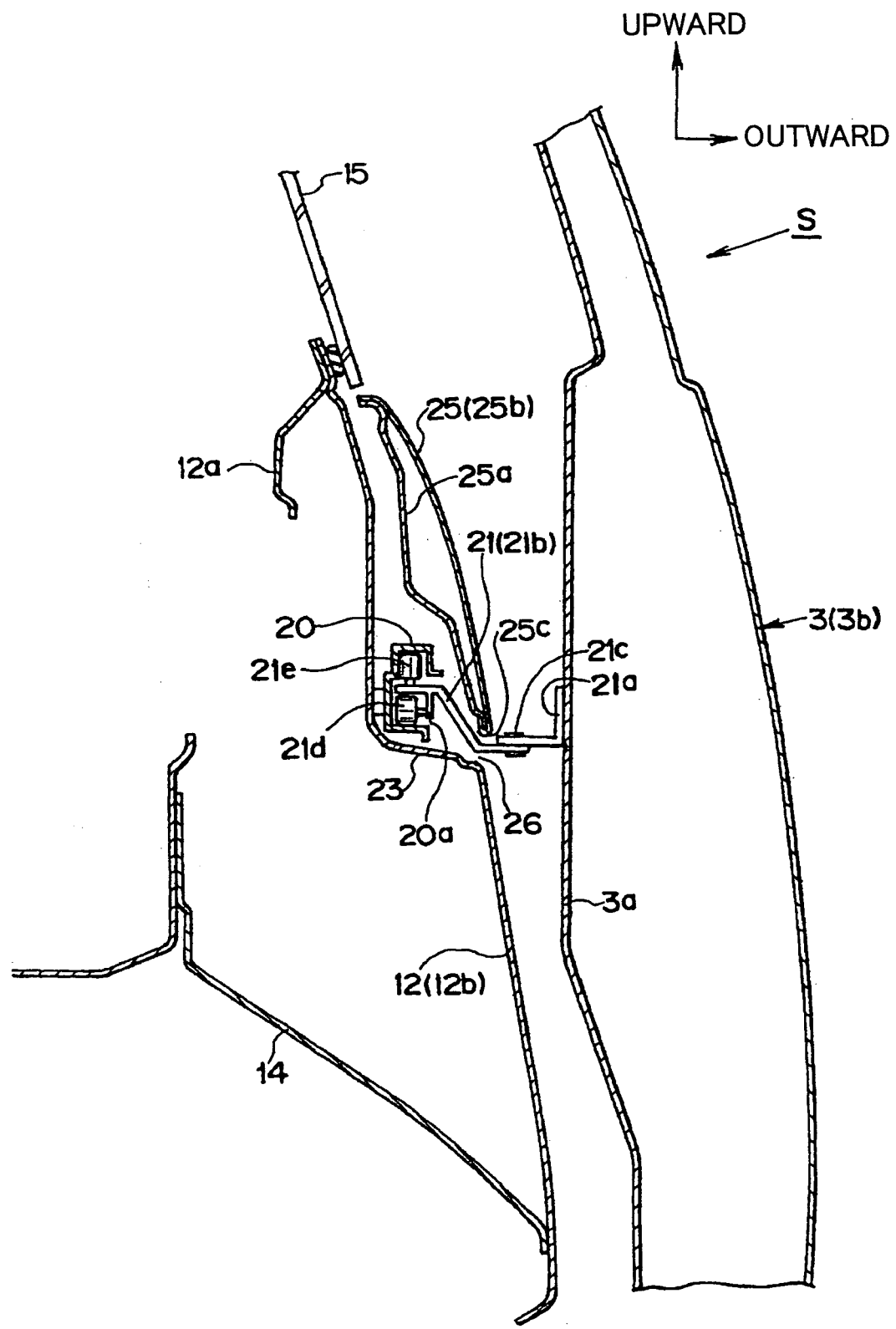
FIG. 5 is a longitudinal sectional view of the vehicle-body rear part in which the slide door is kept opened in FIG. 4, showing the relation between each of a guide rail, a door support member and the cover member.

In the vehicle S, a back opening 5 is formed in its rear surface (also see FIG. 4). This back opening 5 is opened and closed by a back door 6. The back door 6 swings on its upper-end part so that it can be opened and closed. However, it may also be opened and closed suitably, for example, it may swing laterally on its end part in the vehicle-width directions.

Figure 2:
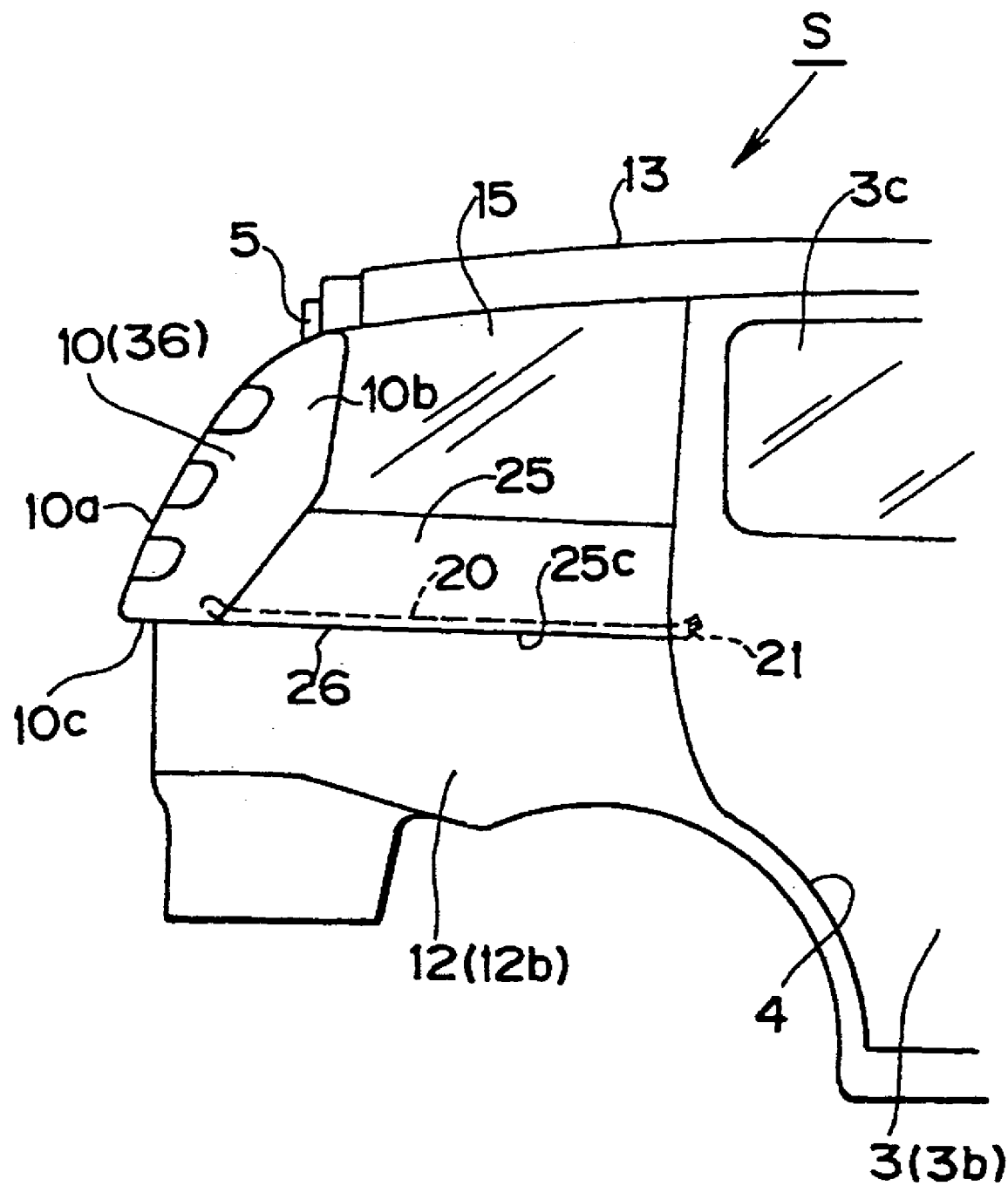
FIG. 2 is a side view of the rear part of the vehicle body in FIG. 1, showing a state where a rear bumper and a back door are removed.
Figure 3:
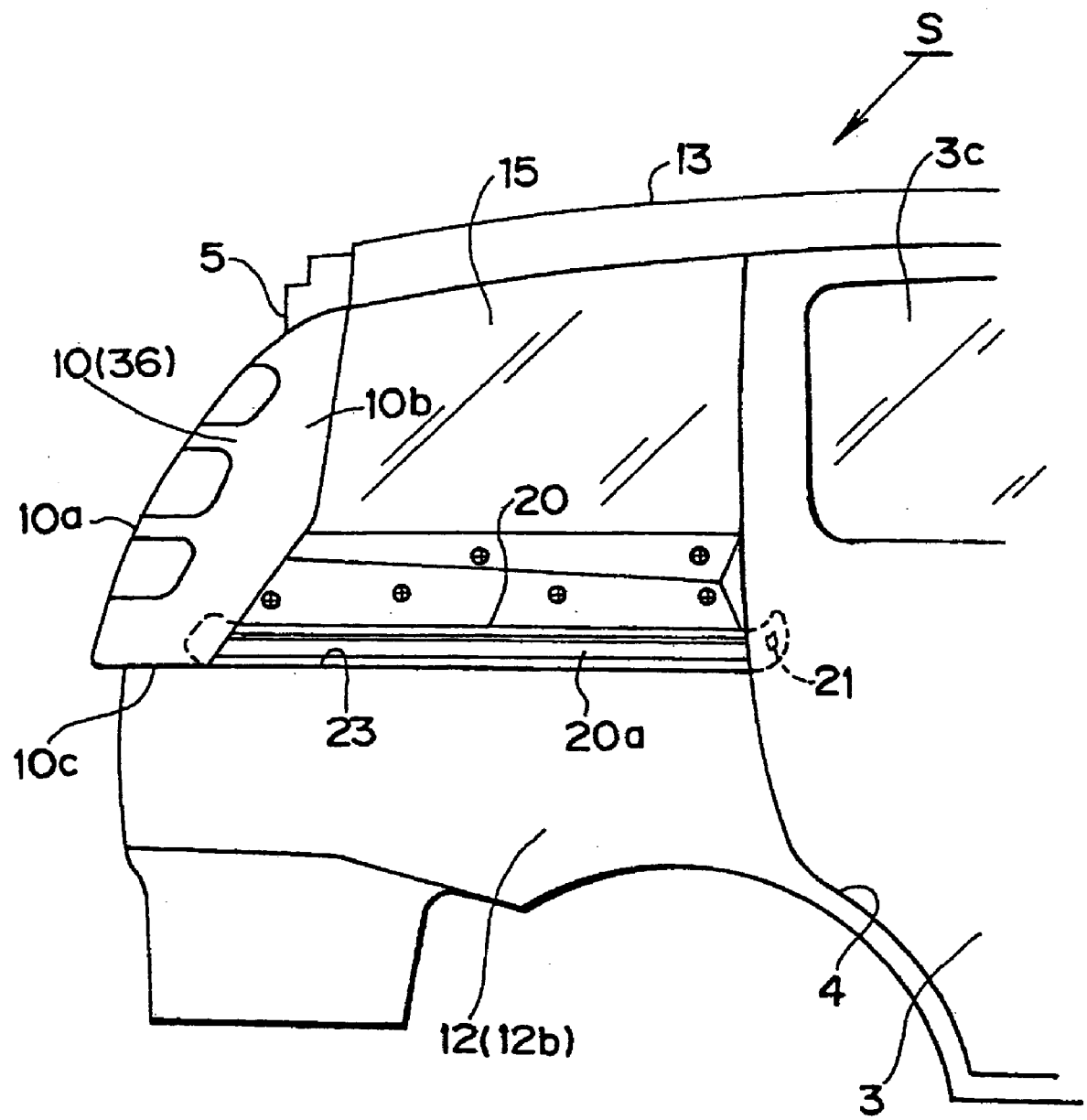
FIG. 3 is a side view of the vehicle-body rear part in FIG. 2, showing a state where a cover member is removed.

As shown in FIG. 1 to FIG. 4, in the vehicle S, a tail lamp 10 is provided at each end part in the vehicle-width directions (i.e., in the right-and-left directions) of its rear-end part. This tail lamp 10 is attached to a rear pillar which is located on each of the right and left of the back door 6. It is fixed in a certain position of the vehicle body, whether the back door 6 is opened or closed. The tail lamp 10 includes a rear-surface portion 10a which faces behind the vehicle S, and a side-surface portion 10b which faces on the outside in the vehicle-width directions. In such a tail lamp 10, for example, at least one of a side light (or lamp), a brake lamp and a turn indicator light is placed. According to this embodiment, all of them are integrated. Herein, in FIG. 1, reference numeral 7 denotes a rear bumper. In FIG. 2 to FIG. 4, the rear bumper 7 and the back door 6 are removed. In FIG. 1 to FIG. 4, reference numeral 12 designates a rear quarter panel which configures the vehicle-body side part behind the rear opening 4, and 13 denotes a roof (or roof panel). As shown in FIG. 5, the rear quarter panel 12 has a section which is closed with an inner panel 12a and an outer panel 12b. A rear quarter-window glass 15 is provided in the upper part of the rear quarter panel 12. The rear-end part of the rear quarter panel 12 configures the rear pillar to which the tail lamp 10 is attached.

To the vehicle-body side part, a guide rail 20 is attached behind the rear opening 4. This guide rail 20 is used to guide the slide door 3 in the front and rear directions. Its front end is located at the rear-edge part of the rear opening 4, and its rear end extends rearward slightly from the front end of the tail lamp 10, if seen from the side of the vehicle body. The guide rail 20 which extends in the front and rear directions is designed so that its lower edge is located substantially at the same height as a lower horizontally-seen line 10c of the tail lamp 10. In other words, the tail lamp 10 extends upward from the level of the guide rail 20. The above described side light, brake lamp and turn indicator light are placed apart from each other in the up-and-down directions. Such a guide rail 20 is located at substantially the middle part of the slide door 3 in the up-and-down directions. In other words, the guide rail 20 is in a position slightly lower from a belt-line which is located right below the window glass 3c of the slide door 3. This guide rail 20 is fixed on the vehicle body by welding, bolt fixing, or the like.

Figure 6:
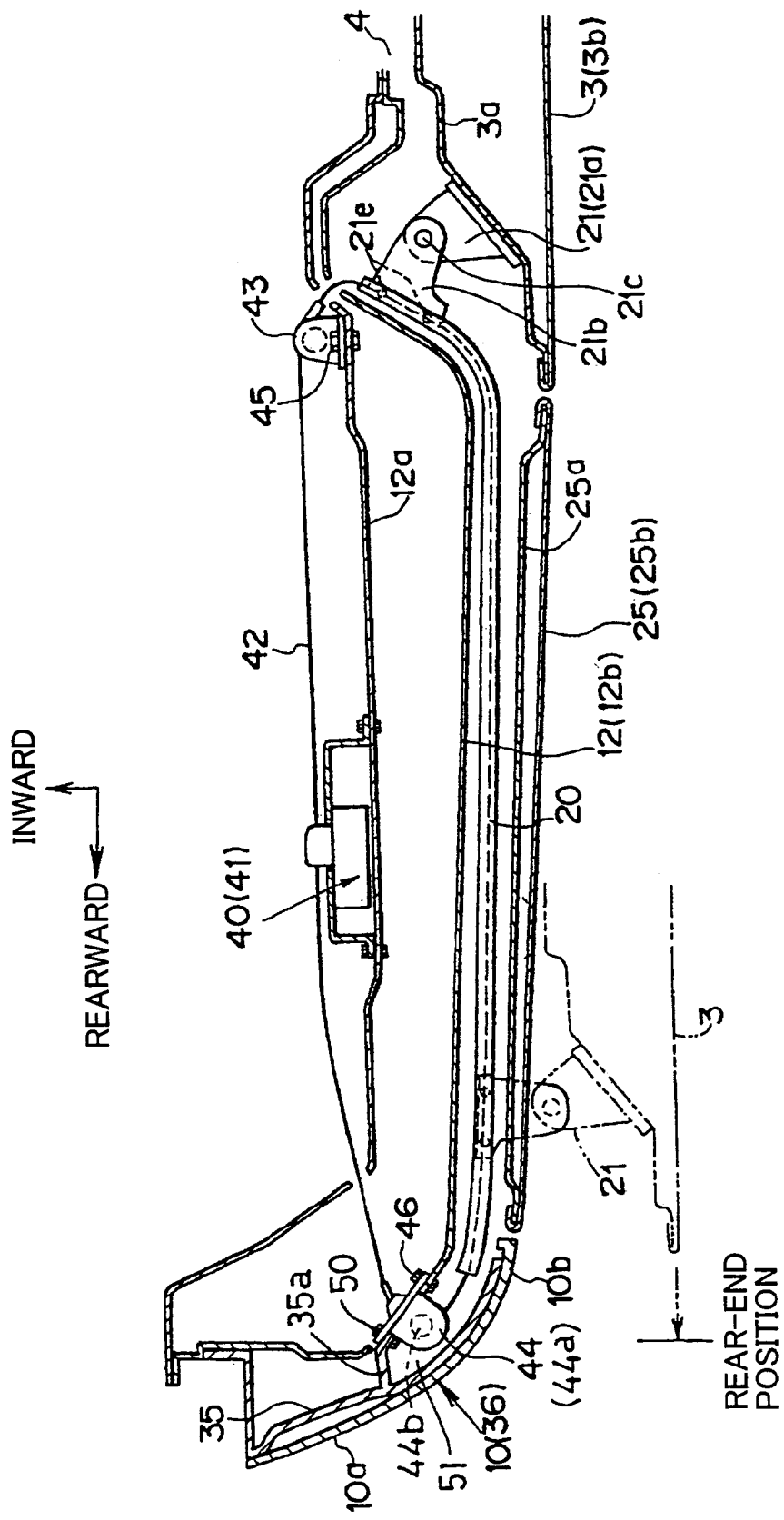
FIG. 6 is a horizontal sectional view of the vehicle-body rear part at the height of the guide rail, showing an example of a driving mechanism.

As shown in FIG. 3 and FIG. 5, the guide rail 20 has an opening portion 20a which is opened outward in the vehicle-width directions. This opening portion 20a extends over the full length of the guide rail 20. Into such a guide rail 20, as shown in FIG. 5 and FIG. 6, a door support member 21 is fitted so as to slide. This door support member 21 is attached to the rear inner-end part of the slide door 3. It includes a pair of bracket members 21a, 21b, and the one bracket member 21a is fixed on the slide door 3 by welding, bolt fixing, or the like. To the tip-end part of the bracket member 21a, the base-end part of the other bracket member 21b is connected by means of a pin 21c, so that the bracket member 21b can turn on its axial line in the up-and-down directions.

On the tip-end part of the other bracket member 21b, a pair of guide rollers 21d, 21e are held so as to rotate. The one guide roller 21d can rotate on its axial line which extends in substantially the horizontal directions. Thereby, it is designed to move on the bottom-wall part of the guide rail 20. In other words, the guide roller 21d is supposed mainly to keep the slide door 3 from being displaced downward. The other guide roller 21e can rotate on its axial line which extends in the up-and-down directions. It is located between a pair of side-wall parts of the guide rail 20. Those side-wall parts are disposed at a certain distance from each other in the vehicle-width directions, so that they prevents the guide roller 21e from being shifted beyond that distance in the vehicle-width directions. In other words, the guide roller 21e is supposed to keep the slide door 3 from being displaced in the vehicle-width directions. Herein, as such guide rollers 21d, 21e, two pairs are provided in front and behind at a short interval in the front and rear directions.

A panel member, which is located behind the rear opening 4 through which a person gets into and out of the vehicle and forms an exterior surface of the vehicle body, is configured by the above described outer panel 12b of the rear quarter panel 12. As shown in FIG. 5, to this outer panel 12b, a panel member 14 is connected which configures a rear wheel housing. At the level of the guide rail 20, the outer panel 12b dents inward in the vehicle-width directions, and continuously, extends upward. Hence, a level difference 23 is formed by denting inward in the vehicle-width directions, and the guide rail 20 is disposed above the part of the level difference 23. In other words, the guide rail 20 is designed so as not to protrude outward in the vehicle-width directions from the extended line which is formed by extending upward the exterior surface of the outer panel 12b located below the guide rail 20.

The guide rail 20 is covered with a cover member 25 from the outside in the vehicle-width directions. This cover member 25 has, as shown in FIG. 5 and FIG. 6, a section which is closed with an inner panel 25a and an outer panel 25b. When the guide rail 20 is covered with the cover member 25, the outer panel 25b continues smoothly to the outer panel 12b located below it, so that they are substantially on the same surface. The above described rear quarter-window glass 15 is attached to an upper panel part above the level difference 23 in the outer panel 12b of the panel member 12. The upper edge of the cover member 25 continues smoothly to the lower edge of the rear quarter-window glass 15. In other words, the cover member 25 is designed to smoothly connect the rear quarter-window glass 15 and the outer panel 12b below the level difference 23. In addition, in the exterior surface of the cover member 25, its front edge continues closely and smoothly to the rear edge in the exterior surface of the slide door 3 which is kept closed.

A lower edge 25c of the cover member 25 extends straight in the front and rear directions along the guide rail 20. Between it and the outer panel 12b which is a rear fender, a little space 26 is formed in the up-and-down directions (see FIG. 5). This space 26 extends straight in the front and rear directions along the guide rail 20. The bracket member 21b of the above described door support member 21 is disposed to pass through the space 26. In such a space 26, its rear end is positioned substantially at the same height as a lower horizontally-seen line 10c of the tail lamp 10 (see FIG. 1 and FIG. 2), and continues smoothly to the line 10c. In the cover member 25, its rear edge is located immediately near the tail lamp 10. The exterior surface of the cover member 25 continues smoothly to the exterior surface of the tail lamp 10, substantially on the same surface (see FIG. 6). Hence, in the front and rear directions, the exterior surface of the cover member 25 configures the exterior surface of the vehicle body from the slide door 3 which is kept closed over to the tail lamp 10. In addition, in the up-and-down directions, it configures the exterior surface of the vehicle body from the rear quarter-window glass 15 over to the level difference 23. In other words, the exterior surface of the cover member 25 is designed to continue smoothly to each of its peripheral members in the up-and-down and front-and-rear directions. This improves the external appearance of the vehicle-body side part.

As shown in FIG. 6, the front-end part of the guide rail 20 is bent forward and inward in the vehicle-width directions. When the slide door 3 is in the position where it closes the rear opening 4 through which a person gets into and out of the vehicle, the door support member 21 is located at the front-end part of the guide rail 20 (i.e., in the position shown by a solid line in FIG. 6). When the slide door 3 is slid rearward from this state, it once goes outward in the vehicle-width directions, and then, moves rearward. FIG. 6 shows, by two-dot chain lines, a state where the slide door 3 is moved up to the vicinity of its rear end. The guide rail 20 extends rearward further from the front end of the tail lamp 10, and thus, the slide door 3 can be moved rearward further from the position shown by the two-dot chain lines in FIG. 6. At its rearmost end, the rear-end part of the door support member 21 is located behind the front end of the tail lamp 10, if seen from the side of the vehicle body.

The slide door 3 is opened and closed by a driving mechanism 40. The driving mechanism 40 includes: a drive portion 41 which houses a motor for driving or the like; a wire 42 which has no end and a ring shape (i.e., it is endless), the wire 42 being connected to the door support member 21; and a pair of front and rear guide portions 43, 44 which guides the wire 42. Inside of each guide portion 43, 44, there is provided a guide pulley. The wire 42 is disposed to pass through the guide rail 20, and is also placed to pass through the drive portion 41 and (the guide pulleys of) the guide portions 43, 44. If the motor inside of the drive portion 41 is rotated, for example, in its regular direction, then the slide door 3 is driven forward. On the other hand, if the motor is rotated, for example, in its reverse direction, then the slide door 3 is driven rearward. Herein, the motor is controlled so as to stop in the front-end position and the rear-end position of the slide door 3. This keeps the slide door 3 from moving forward and rearward beyond predetermined positions. However, at each of the front and rear ends of the guide rail 20, for example, a stopper may also be provided which the door support member 21 comes into contact with. This also prevents the slide door 3 from moving back and forth further from the predetermined positions. Of course, the slide door 3 may also come into contact with the front edge of the rear opening 4 through which a person gets into and out of the vehicle. Thereby, the slide door 3 can be prevented from moving forward beyond the predetermined position. Herein, a command to drive the drive portion 41 is given using a manual switch or a remote-control switch provided in the vehicle cabin. In other words, such a switch issues a command to open or close the slide door 3.

With respect to the above described pair of front and rear guide portions 43, 44, the front guide portion 43 is located near the front end of the guide rail 20. It is fixed on the inner panel 12a of the rear quarter panel 12, by means of a fixing part 45 such as a bolt. On the other hand, the rear guide portion 44 is located right near the tail lamp 10, so that it faces an inner surface of the tail lamp 10. It is fixed on the outer panel 12b of the rear quarter panel 12, by means of a fixing part 46 such as a bolt. This rear guide portion 44 is located a little behind the guide rail 20 and rearward from the front end of the tail lamp 10. In other words, if seen from the side of the vehicle body, the guide portion 44 overlaps with the tail lamp 10 in the vehicle-width directions. Herein, the rear guide portion 44 has a structure in which a casing 44a houses a guide pulley 44b (and the front guide portion 43 also has the same structure). This guide portion 44 (or The casing 44a thereof) is fixed on the tail lamp 10 (as described later).

Figure 7:
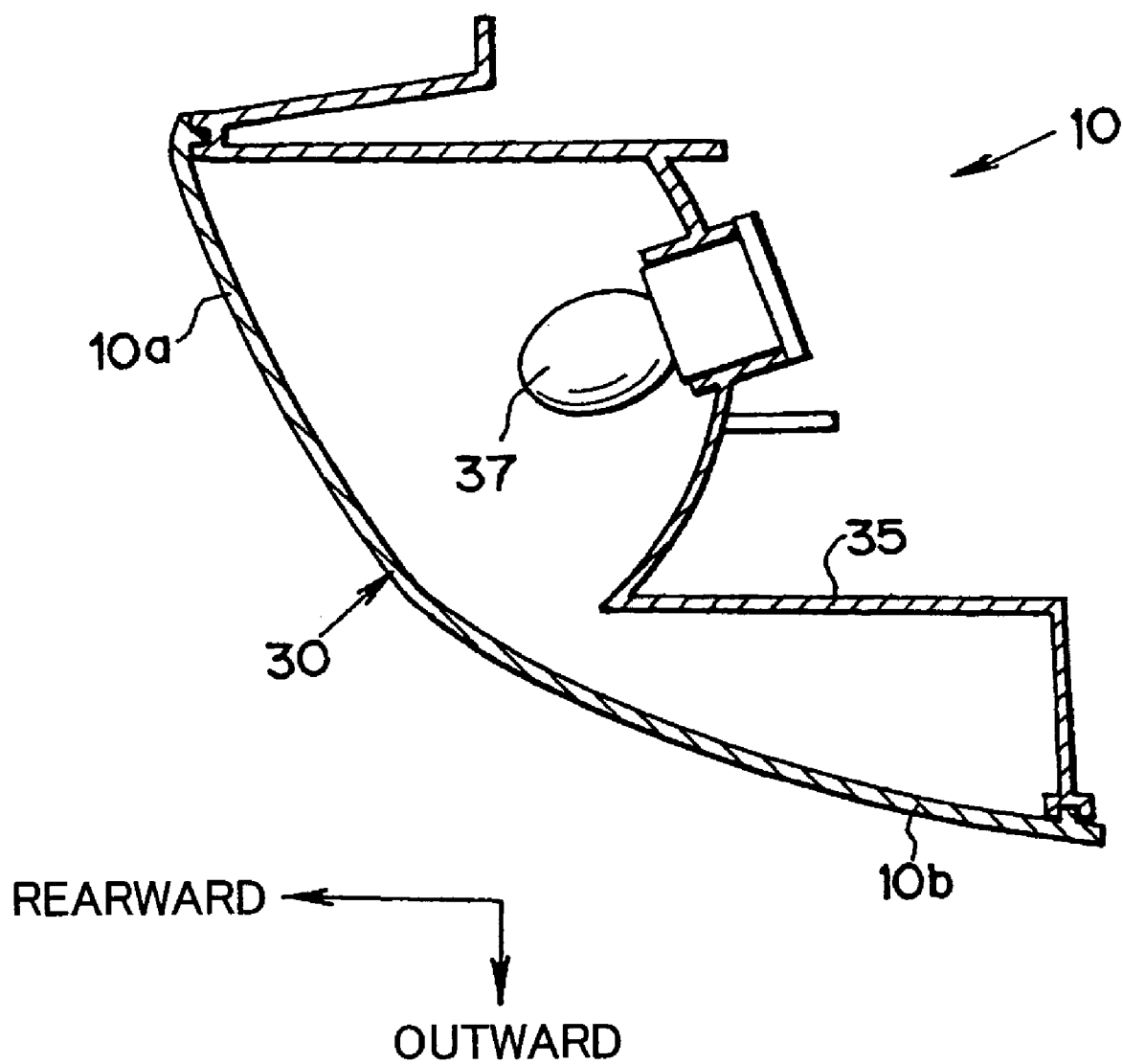
FIG. 7 is a horizontal sectional view of a tail lamp at a position higher than the guide rail.

Herein, the tail lamp 10 has, as shown in FIG. 6 and FIG. 7, a hollow shape which is formed by an inner casing 35 and a lens panel 36 which configures the exterior surface of the tail lamp 10. In the position where the guide portion 44 is located, the whole hollow part of the tail lamp 10 is narrow in the front and rear directions (see FIG. 6). On the other hand, in a position above the guide portion 44, the hollow part of the tail lamp 10 is, in the front and rear directions, broad enough to dispose a lamp 37 (see FIG. 7). As is apparent in FIG. 6, the tail lamp 10 has a rearward-convex shape at least near the position of the guide portion 44. In other words, it is concave there in the front direction. In this concave part, the guide portion 44 is disposed, and the rear-end part of the guide rail 20 is also located.

In the inner casing 35 of the tail lamp 10, an attachment portion 35a is formed which protrudes forward like a tongue. To this attachment portion 35a, the guide portion 44 is fixed by means of a fixing part 50 such as a bolt. In other words, the casing 44a of the guide portion 44 is fixed not only to the outer panel 12b by means of the above described fixing part 46, but also to the tail lamp 10 by means of the fixing part 50. When the guide portion 44 is attached to the vehicle body, in advance, by means of the fixing part 50, the guide portion 44 is attached to the tail lamp 10. Then, at the time when the tail lamp 10 is attached to the vehicle body, by means of the fixing part 46, the guide portion 44 can be attached to the vehicle body. This allows the guide portion 44 to be easily integrated into the vehicle body, and also heightens their attachment strength after integrated.

Figure 8:
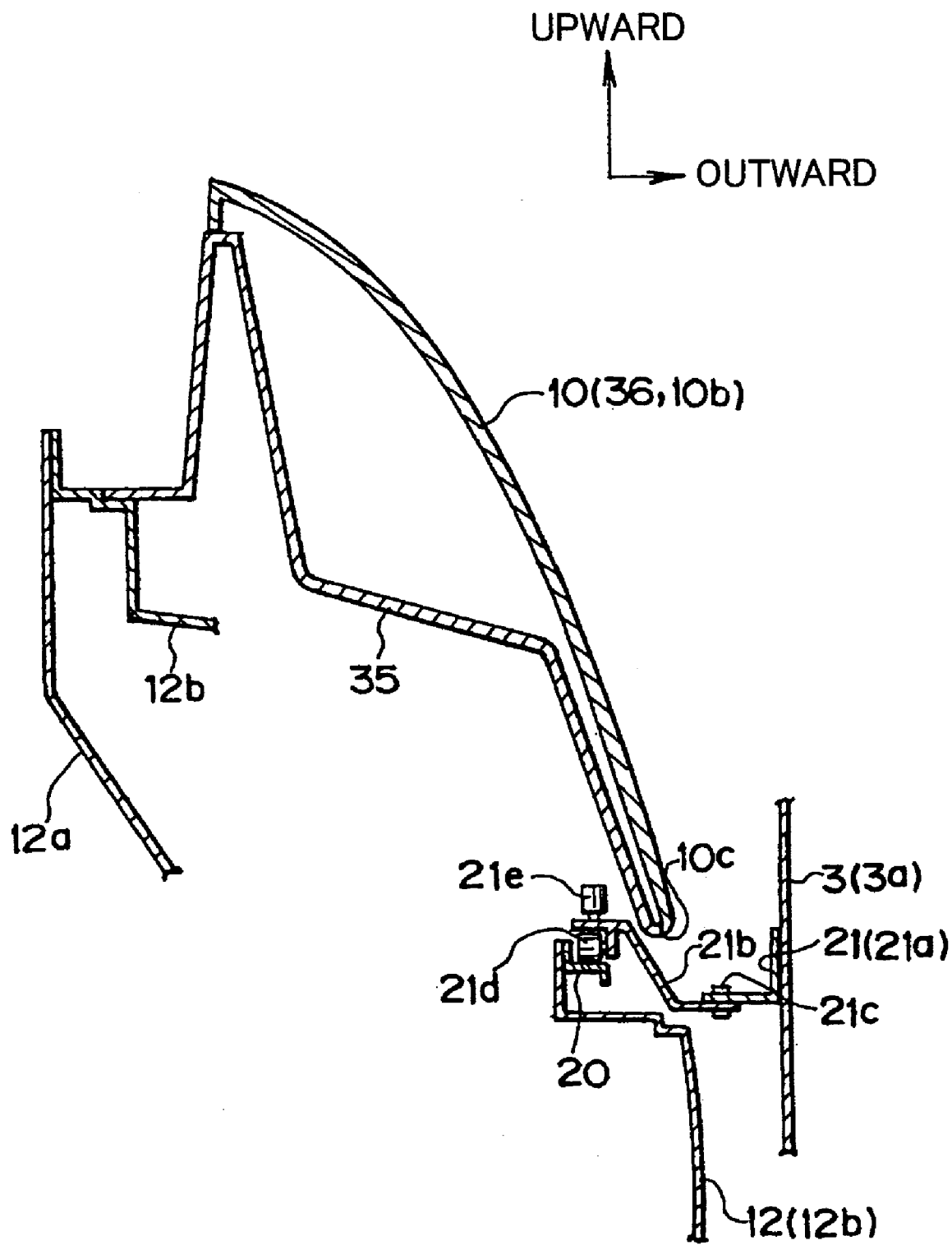
FIG. 8 is a longitudinal sectional view of the vehicle-body rear part which corresponds to FIG. 5, showing the rear-end part of the guide rail.

FIG. 8 shows in detail the part of the guide rail 20 which extends behind the front end of the tail lamp 10. As is apparent in FIG. 8, the rear-end part of the guide rail 20 does not have a pair of right and left side-wall parts which keeps the guide roller 21e located behind from being displaced in the vehicle-width directions. The lower-edge part of the tail lamp 10 is located outward in the vehicle-width directions from the guide roller 21e. Herein, in the guide rail 20, the part where the pair of upper and lower guide rollers 21d, 21e are located has the same section as in the case of those located in front in FIG. 5.

In FIG. 1, reference numeral 8 denotes a side sill. In this side sill 8, at its part located behind the rear opening 4 through which a person gets into and out of the vehicle, a guide rail 31 is formed in its exterior surface in the vehicle-width directions. The guide rail 31 is used to guide the slide door 3 in the front and rear directions. Into the guide rail 31, the tip-end part of a door support member 32 is fitted, which is attached to the front inner-end part of the slide door 3. Herein, the guide rail 31 and the door support member 32 which are located in front have only the function of smoothly sliding and guiding the slide door 3 along a predetermined track. In short, the above described driving mechanism 40 is not provided. Herein, the front guide rail 31 and door support member 32 are provided so that the slide door 3 can be slid more smoothly in the front and rear directions, and thus, they are not necessarily required.

Figure 9:
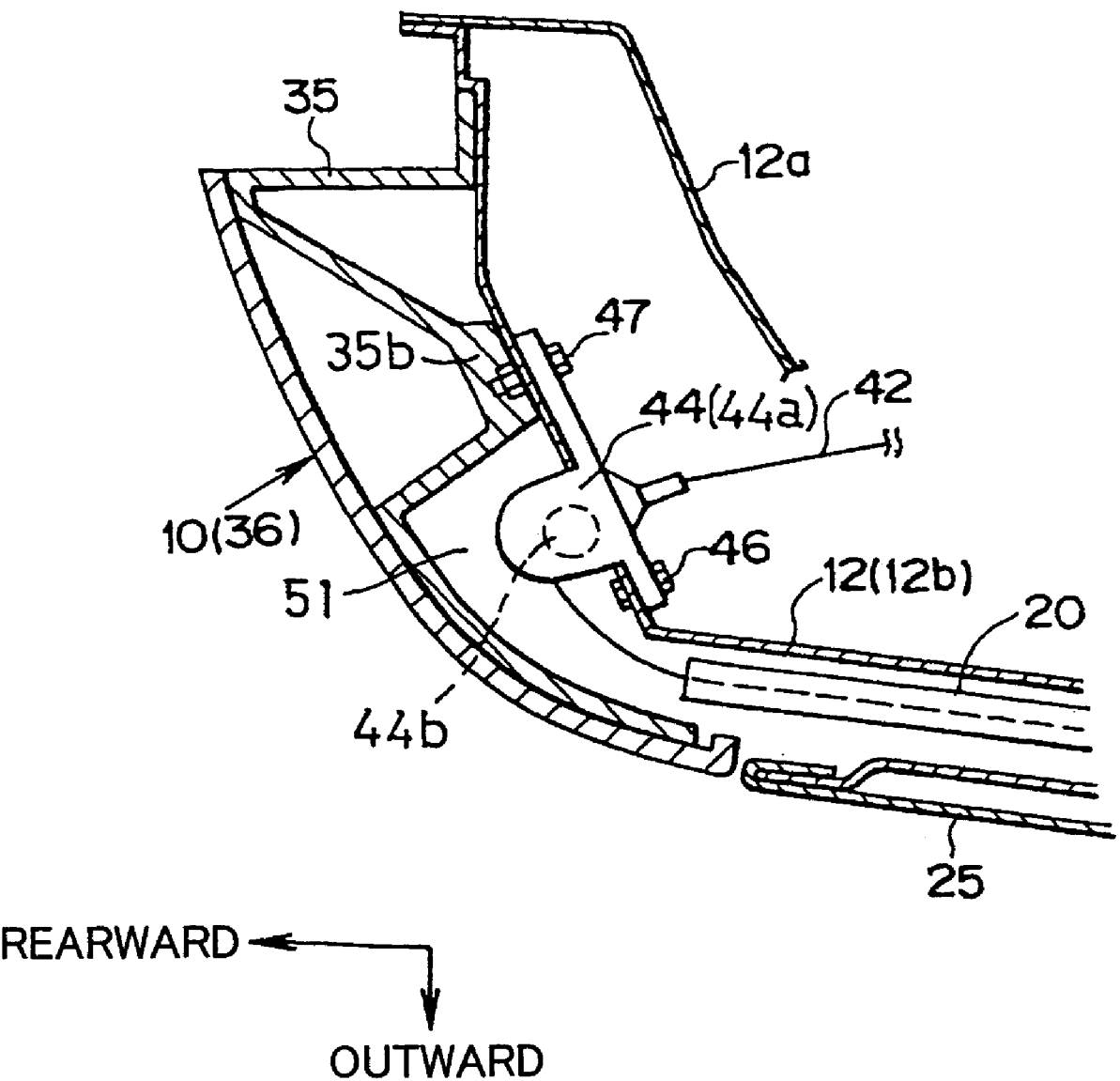
FIG. 9 is a sectional view of the main part which corresponds to FIG. 6 according to a second embodiment of the present invention.

FIG. 9 shows the vehicle slide-door supporting structure according to a second embodiment of the present invention. It corresponds to the part of the guide portion 44 shown in FIG. 6. According to this embodiment, the rear guide portion 44 is fixed to the outer panel 12b by means of the fixing part 46 such as a bolt. In addition, by means of a fixing part 47 such as a bolt which fix the tail lamp 10 on the outer panel 12b, the guide portion 44 is fixed to the outer panel 12b. In other words, an attachment portion 35b where the tail lamp 10 is attached to the vehicle body, and the guide portion 44, are fixed together to the outer panel 12b by means of the fixing part 47. Herein, the attachment portion 35b of the tail lamp 10 to the vehicle body is strong (or rigid) enough. In addition, the attachment portion 35b may also be extended farther so that the outer panel 12b and the attachment portion 35b can be fixed together also by means of the bolt 46 (i.e., the former and the latter two members are each fixed together by means of several fixing parts).

Figure 10:
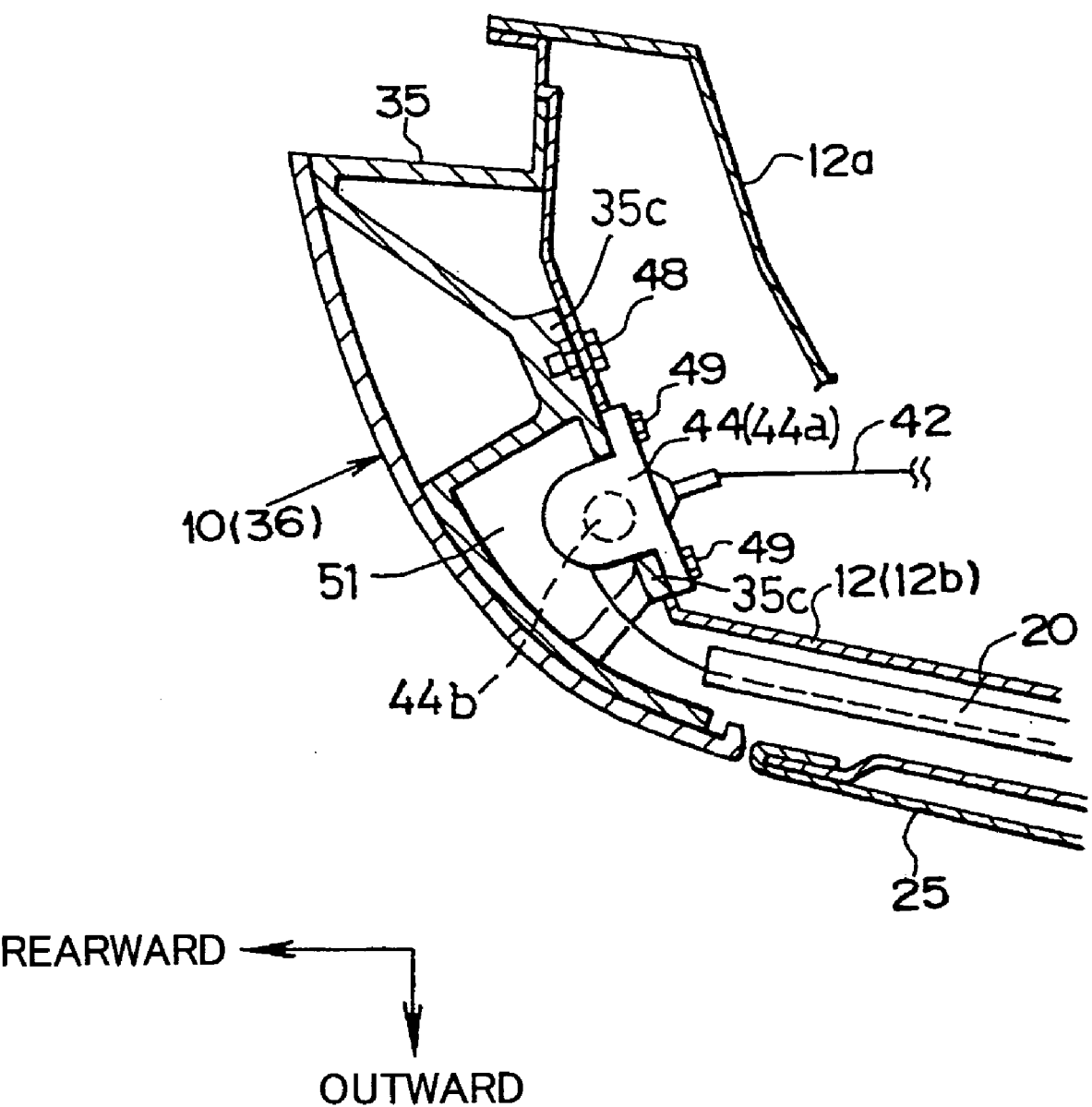
FIG. 10 is a sectional view of the main part which corresponds to FIG. 6 according to a third embodiment of the present invention.

FIG. 10 shows the vehicle slide-door supporting structure according to a third embodiment of the present invention. According to this embodiment which corresponds to FIG. 9, an attachment portion 35c of the inner casing 35 in the tail lamp 10 is fixed to the outer panel 12b by means of a fixing part 48 such as a bolt. The guide portion 44 is fixed to the attachment portion 35c of the inner casing 35, by means of fixing parts 49 such as bolts. Hence, according to this embodiment, by means of the fixing parts 49, the tail lamp 10 and the guide portion 44 are fixed as a module (or a unit). In this case, if the tail lamp 10 is fixed in a predetermined position of the outer panel 12b or the vehicle body, then the guide portion 44 is mechanically fixed in a predetermined position of the vehicle body. Herein, the attachment portion 35c of the inner casing 35 to the vehicle body according to this embodiment is formed by extending the attachment portion 35b of FIG. 9 longer along the outer panel 12b. This attachment portion 35c is also used as an attachment portion where the guide portion 44 is attached to the tail lamp 10.

Hereinafter, the guide portion 44 disposed behind will be described in further detail. First, according to each embodiment of FIG. 6, FIG. 9 and FIG. 10, the guide portion 44 includes, as described earlier: the casing 44a which is attached directly, or indirectly via the tail lamp 10, to the vehicle body; and the guide pulley 44b which is disposed inside of this casing 44a and around which the wire 42 is placed (or wound). At least the guide pulley 44b itself is located in the vehicle-body outside direction from the outer panel 12b to which the guide rail 20 is attached. Herein, the axial line on which the guide pulley 44b rotates is set to extend substantially in the up-and-down directions. However, from the point of view of its positional relation with the drive portion 41 or the like, it may also be set to extend substantially in the horizontal directions. Or, it can also be set to incline from each of the up-and-down directions and in the horizontal directions, or the like.

The guide portion 44 or the guide pulley 44b is located in the boundary position between the vehicle-body rear plane and the vehicle-body side plane in the outer panel 12b. Besides, it is located in the vehicle-body outside direction from this boundary position. Therefore, the wire 42 which is pulled out of the rear end of the guide rail 20 passes through the guide pulley 44b and is guided in the vehicle-body inside direction. Thereafter, when drawn and turned forward, the wire 42 does not need to be forcibly bent.

In the tail lamp 10, its part which faces at least the guide portion 44 is a concave portion 51 which opens forward. In other words, in the example of FIG. 6, the whole front surface of the tail lamp 10 is bent over almost its full length in the vehicle-width directions, so that it becomes convex rearward (or concave forward). In this way, the concave portion 51 is formed. On the other hand, in the examples of FIG. 9 and FIG. 10, only the part which faces the guide portion 44 is the concave portion 51 which opens forward. In each case, the guide portion 44 is disposed in the concave portion 51 so that it protrudes into the concave portion 51.

Hereinbefore, the embodiments have been described, but a part of the tail lamp 10 may also be attached to the back door 6. In addition, the tail lamp 10 can also be placed in a far lower position than according to the embodiments, so that its upper edge (i.e., upper horizontally-seen line) is positioned substantially at the same height as the guide rail 20. Furthermore, the rear end of the guide rail 20 may also be located just near the front end of the tail lamp 10, not behind the front end of the tail lamp 10. Moreover, the drive portion 41 of the driving mechanism 40 may also be attached to the tail lamp 10, in the same way as the guide portion 44. Besides, both the drive portion 41 and the guide portion 44 may also be attached to the tail lamp 10. In addition, this drive portion 41 may also be wrapped from frontward in the tail lamp 10. Herein, the objects of the present invention are not limited to the described ones. They also tacitly include providing the ones which are described as practically preferable or advantageous.

This application is based on Japanese patent application serial Nos. 2003-311382, 2003-311383, 2003-311384, 2003-311385, filed in Japan Patent Office on Sep. 3, 2003, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A vehicle slide-door supporting structure, comprising:
   a slide door which is a side door that opens and closes an opening through which a person gets into and out of a vehicle, the opening being formed in a side part of a vehicle body, the side door being slid in the front and rear directions so that the opening is opened and closed, and the opening being opened when the side door is slid rearward; and
   a driving mechanism which is connected to the slide door and drives the slide door,
   wherein one part of the driving mechanism is substantially directly attached to a tail lamp which is disposed at the rear part of the vehicle body.

2. The vehicle slide-door supporting structure according to claim 1, wherein the one part of the driving mechanism and the tail lamp are assembled beforehand into a unit body, and the unit body is attached to the vehicle body so that the part of the driving mechanism and the tail lamp are attached to the vehicle body.

3. The vehicle slide-door supporting structure according to claim 1, wherein an attachment portion of the tail lamp to the vehicle body, together with the one part of the driving mechanism, is fixed on the vehicle body, by means of a fixing part.

4. The vehicle slide-door supporting structure according to claim 1, further comprising:
   a guide rail, disposed in the side part of the vehicle body, which extends in the front and rear directions and guides the slide door in the front and rear directions; and
   wherein the rear end of the guide rail extends up to a position adjacent to the tail lamp.

5. The vehicle slide-door supporting structure according to claim 4, wherein at least the rear end of the guide rail is positioned substantially at the same height as the horizontally-seen line of the tail lamp.

6. The vehicle slide-door supporting structure according to claim 4, wherein:
   a cover member is disposed which forms an exterior surface of the vehicle body and covers the guide rail from the outside of the vehicle body;
   the lower edge of the cover member extends in the front and rear directions along the guide rail and is substantially at the same height as the horizontally-seen line of the tail lamp; and
   the exterior surface of the cover member continues to the exterior surface of the tail lamp with little space and substantially on the same surface.

7. The vehicle slide-door supporting structure according to claim 1, wherein the driving mechanism includes a drive motor for driving the slide door.

8. A vehicle slide-door supporting structure, comprising:
   a slide door which is a side door that opens and closes an opening through which a person gets into and out of a vehicle, the opening being formed in a side part of a vehicle body, the side door being slid in the front and rear directions so that the opening is opened and closed, and the opening being opened when the side door is slid rearward; and
   a driving mechanism which is connected to the slide door and drives the slide door,
   wherein one part of the driving mechanism is attached to a tail lamp which is disposed at the rear part of the vehicle body, wherein:
   a concave portion which is opened frontward is formed in the front part of the tail lamp; and
   the one part of the driving mechanism is located inside of the concave portion.

9. A vehicle slide-door supporting structure, comprising:
   a slide door which is a side door that opens and closes an opening through which a person gets into and out of a vehicle, the opening being formed in a side part of a vehicle body, the side door being slid in the front and rear directions so that the opening is opened and closed, and the opening being opened when the side door is slid rearward; and
   a driving mechanism which is connected to the slide door and drives the slide door,
   wherein one part of the driving mechanism is attached to a tail lamp which is disposed at the rear part of the vehicle body,
   wherein the one part of the driving mechanism is attached to an attachment portion of the tail lamp to the vehicle body.

10. A vehicle slide-door supporting structure, comprising:
    a slide door which is a side door that opens and closes an opening through which a person gets into and out of a vehicle, the opening being formed in a side part of a vehicle body, the side door being slid in the front and rear directions so that the opening is opened and closed, and the opening being opened when the side door is slid rearward; and
    a driving mechanism which is connected to the slide door and drives the slide door,
    wherein one part of the driving mechanism is attached to a tail lamp which is disposed at the rear part of the vehicle body, wherein:
    the driving mechanism includes a wire which is connected to the slide door, a drive portion which drives the slide door via the wire, and a guide portion which guides the wire; and
    the one part of the driving mechanism which is attached to the tail lamp is the guide portion.

11. The vehicle slide-door supporting structure according to claim 10, wherein the guide portion includes a guide pulley around which the wire is placed.

12. The vehicle slide-door supporting structure according to claim 10, wherein:

in the rear part of the vehicle body, a boundary position between the vehicle-body rear plane and the vehicle-body side plane is covered with the tail lamp, from the outside of the vehicle body; and the guide portion is disposed to protrude at the boundary position between the vehicle-body rear plane and the vehicle-body side plane and toward the outside of the vehicle body.

13. A vehicle slide-door supporting structure, comprising:
a slide door which is a side door that opens and closes an opening through which a person gets into and out of a vehicle, the opening being formed in a side part of a vehicle body, the side door being slid in the front and rear directions so that the opening is opened and closed, and the opening being opened when the side door is slid rearward; and
a driving mechanism which is connected to the slide door and drives the slide door,
wherein one part of the driving mechanism faces an inner surface of a tail lamp which is disposed at the rear part of the vehicle body.

14. The vehicle slide-door supporting structure according to claim 13, wherein in the one part of the driving mechanism, at least a rear-end part thereof overlaps with the tail lamp in the vehicle-width directions, if seen from the side of the vehicle body.

15. The vehicle slide-door supporting structure according to claim 13, wherein the whole one part of the driving mechanism is located behind the front end of the tail lamp.

16. The vehicle slide-door supporting structure according to claim 13, wherein:
the driving mechanism includes a wire which is connected to the slide door, a drive portion which drives the slide door via the wire, and a guide portion which guides the wire; and
the one part of the driving mechanism includes the guide portion.

17. The vehicle slide-door supporting structure according to claim 16, wherein the guide portion includes a guide pulley around which the wire is placed.

18. The vehicle slide-door supporting structure according to claim 17, further comprising:
a guide rail, disposed in the side part of the vehicle body, which extends in the front and rear directions and guides the slide door in the front and rear directions; and
the rear end of the guide rail extends rearward up to a position adjacent to the tail lamp.

19. The vehicle slide-door supporting structure according to claim 18, wherein at least the rear end of the guide rail is positioned substantially at the same height as the horizontally-seen line of the tail lamp.

20. The vehicle slide-door supporting structure according to claim 18, further comprising:
a cover member which forms an exterior surface of the vehicle body and covers the guide rail from the outside of the vehicle body; and wherein
the lower edge of the cover member extends in the front and rear directions along the guide rail and is substantially at the same height as the horizontally-seen line of the tail lamp; and
the exterior surface of the cover member continues to the exterior surface of the tail lamp with little space and substantially on the same surface.

21. The vehicle slide-door supporting structure according to claim 18, wherein the guide pulley is disposed to protrude toward the outside of the vehicle body from a vehicle-body panel member to which the guide rail is attached.

22. The vehicle slide-door supporting structure according to claim 21, wherein the guide pulley is disposed in a boundary position between the vehicle-body rear plane and the vehicle-body side plane in the rear part of the vehicle body.

23. The vehicle slide-door supporting structure according to claim 17, wherein:
a concave portion which is opened frontward is formed in the front part of the tail lamp; and
the guide pulley is located inside of the concave portion.

24. The vehicle slide-door supporting structure according to claim 13, further comprising:
a guide rail, disposed in the side part of the vehicle body, which extends in the front and rear directions and guides the slide door;
a door support member, disposed in the slide door, which fits into the guide rail so that it is slid;
the guide rail extends rearward so that the rear end thereof comes close to the tail lamp which is disposed at the rear part of the vehicle body; and
a cover member which forms an exterior surface of the vehicle body, covers at least the rear-end part of the guide rail from the outside of the vehicle body and continues to the front edge of the tail lamp.

25. The vehicle slide-door supporting structure according to claim 24, wherein:
the lower edge of the cover member extends straight in the front and rear directions along the guide rail;
the lower edge of the cover member continues to a panel member with a little space in the up-and-down directions and substantially on the same surface, the panel member being located below the cover member and forming an exterior surface of the vehicle body;
the door support member is disposed to pass through the space and slide along the lower edge of the cover member; and
the front edge of the cover member continues adjacently and smoothly to the rear edge of the slide door which is kept closed.

26. The vehicle slide-door supporting structure according to claim 25, wherein:
the panel member has a level difference which dents toward the inside of the vehicle body and extends in the front and rear directions, and above the level difference, the guide rail and the cover member are disposed;
in the panel member, rear quarter-window glass is attached to an upper panel portion which is located upward from the level difference; and
the cover member connects smoothly the upper edge of a lower panel portion which is located downward from the level difference in the panel member and the lower edge of the rear quarter-window glass.

27. A vehicle slide-door supporting structure, comprising:
a slide door which is a side door that opens and closes an opening through which a person gets into and out of a vehicle, the opening being formed in a side part of a vehicle body, the side door being slid in the front and rear directions so that the opening is opened and closed, and the opening being opened when the side door is slid rearward;
a guide rail, disposed in the side part of the vehicle body, which extends in the front and rear directions and guides the slide door;
a door support member, disposed in the slide door, which fits into the guide rail so that it is slid;

the guide rail extends rearward so that the rear end thereof comes close to the tail lamp which is disposed at the rear part of the vehicle body; and a horizontal line on the tail lamp is set to be substantially at the same height as the guide rail.

28. The vehicle slide-door supporting structure according to claim 27, wherein the door support member is slid up to the vicinity of the tail lamp as the slide door moves rearward.

29. The vehicle slide-door supporting structure according to claim 27, wherein the rear-end part of the guide rail extends rearward from the front end of the tail lamp, if seen from the side of the vehicle body.

30. The vehicle slide-door supporting structure according to claim 29, wherein the door support member is slid rearward so that the rear-end part thereof is positioned behind the front end of the tail lamp.

31. The vehicle slide-door supporting structure according to claim 29, wherein:

a cover member is disposed which covers the guide rail from the outside of the vehicle body and whose lower edge extends in the front and rear directions;

the cover member forms an exterior surface of the vehicle body and continues to a panel member with a little space in the up-and-down directions and substantially on the same surface, the panel member being located below the cover member and forming an exterior surface of the vehicle body; and the door support member is disposed to pass through the space and slide along the lower edge of the cover member.

32. The vehicle slide-door supporting structure according to claim 31, wherein:

the lower edge of the cover member extends straight in the front and rear directions substantially at the same height as the lower horizontally-seen line of the tail lamp; and the exterior surface of the cover member continues to the exterior surface of the tail lamp with little space and substantially on the same surface.

* * * * *